United States Patent

[11] 3,553,509

| [72] | Inventor | Jean Frantz Felix Camille Ceasar Schellekens<br>Grote Markt, Belgium |
|---|---|---|
| [21] | Appl. No. | 792,706 |
| [22] | Filed | Jan. 21, 1969 |
| [45] | Patented | Jan. 5, 1971 |
| [73] | Assignee | U.S. Philips Corporation<br>New York, N.Y.<br>a corporation of Delaware. by mesne assignments |
| [32] | Priority | Jan. 26, 1968 |
| [33] | | Netherlands |
| [31] | | No. 6801183 |

[54] DIRECT-CURRENT MOTOR ENERGIZED BY PERMANENT MAGNETS
2 Claims, 4 Drawing Figs.

[52] U.S. Cl............................................ 310/154,
 310/177, 310/254
[51] Int. Cl........................................ H02k 21/26

[50] Field of Search............................................ 310/154,
 46, 152, 181, 155, 254, 158, 177, 233

[56] References Cited
UNITED STATES PATENTS

| 3,296,471 | 1/1967 | Cochardt..................... | 310/154 |
| 3,270,220 | 8/1966 | Isaacson...................... | 310/154 |
| 3,054,916 | 9/1962 | Cobb............................ | 310/154 |
| 2,059,886 | 11/1936 | Merrill......................... | 310/154 |

*Primary Examiner*—Milton O. Hirshfield
*Assistant Examiner*—R. Skudy
*Attorney*—Frank R. Trifari ABSTRACT: DC motor including a tubular stator housing having a pair of curved permanent magnets mounted on the inner surface thereof. A pair of magnetic pole pieces each comprising a segment of a cylinder are concentrically mounted in contact with the inner surface of the magnets. The outer circumference of the pole piece is at least 1½ times its inner surface thereby concentrating the magnetic flux and reducing the stray flux.

PATENTED JAN 5 1971  3,553,509

INVENTOR.
JEAN F.F.C.C. SCHELLEKENS
BY
AGENT

DIRECT-CURRENT MOTOR ENERGIZED BY PERMANENT MAGNETS

The present invention relates to a direct current commutator motor having a tubular stator and energized by permanent magnets.

Such motors are frequently used in cases of low power consumption, for example in toys, in devices for driving electric contacts of automatic machines, and the like. However, if higher powers are to be supplied at larger voltages, such as in domestic apparatus, energization by means of electromagnets is still preferred because the rotor can then be magnetized to saturation. The conventional permanent magnets supply a flux density which is considerably lower than the saturation density of iron. For example, magnets made of a material which is known under the trade name of "Ferroxdure" and has been described in British Pat. Specification 747,724, supplies a flux density of approximately 0.4 Wb/m$^2$, whereas the saturation density of iron is approximately equal to 1.5 Wb/m$^2$. The same power can then be supplied only if the insufficiently magnetized rotor is provided with a larger number of turns and has larger dimensions, which requires a larger quantity of sheet iron. However, this problem does not play a part in low-power motors so that in this case there is no objection to using permanent magnets.

The invention has for an object to provide direct current commutator motors for higher powers energized by permanent magnets which magnetize the rotor to saturation. In order to obtain the simplest possible construction of the stator, the latter should have a tubular from. These tubes need not be laminated and may be readily cut from long iron tubes.

A motor, in accordance with the invention, is characterized in that the permanent magnets are each in the form of a hollow tube sector, the outer wall of which engages the stator and the inner wall of which engages a corresponding pole piece along a contact surface which is larger, and preferably more than 1½ times larger, than the surface along which the pole piece adjoins the air gap.

Due to the apparently extraordinarily large dimensions of the stator when compared with those of the rotor, however, large permanent magnets can be used. The emanating flux is indeed proportional to the flux-emanating surface of the magnet. This flux is then concentrated by means of the pole pieces and passed on to the rotor. Thus, the pole pieces serve not only to prevent the occurrence of stray flux but also to provide a strong flux concentration. The diameter of the rotor may then be chosen to be smaller for a given power to be supplied. Although the dimensions of the stator become slightly larger, the cost price of the assembly as a whole is reduced.

The invention will now be described more fully with reference to the accompanying drawing, in which.

Figure 1:
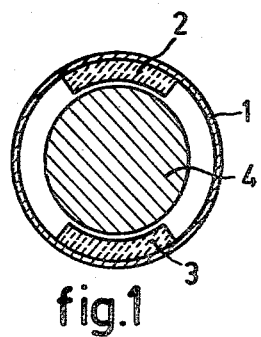
FIG. 1 shows a motor for low voltages and powers energized by permanent magnets.

The motor of FIG. 1 is used for low powers and has a tubular stator 1, two permanent magnets 2 and 3 supplying the energizing flux and a rotor 4. Such motors are generally supplied with a direct voltage of 6 volts to 12 volts. In domestic apparatus, such as textile-washing machines, dough-kneading machines, pumps and the like, powers are required which exceed 100 watts and for which it is desirable to use direct voltages in excess of 100 volts. For the reasons set out above, the energization is supplied by one or more windings 5 (FIG. 2) wound onto a pole piece 6 and electrically energized in series or in parallel with the armature winding or directly by a fixed direct voltage. In this case the pole piece serves to minimize the reluctance of the magnetic flux circuit and the stray flux.

Figure 2:
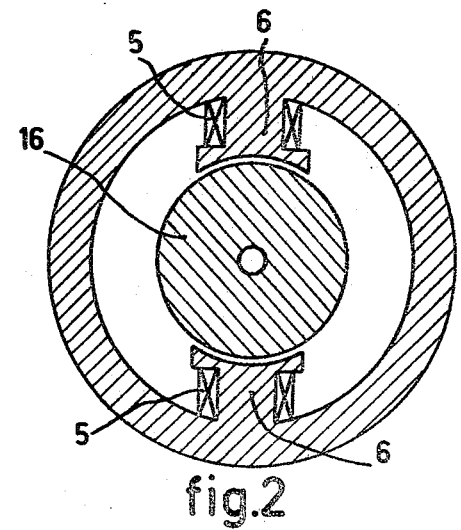
FIG. 2 shows a motor for higher voltages and powers energized by electromagnets.
Figure 3:
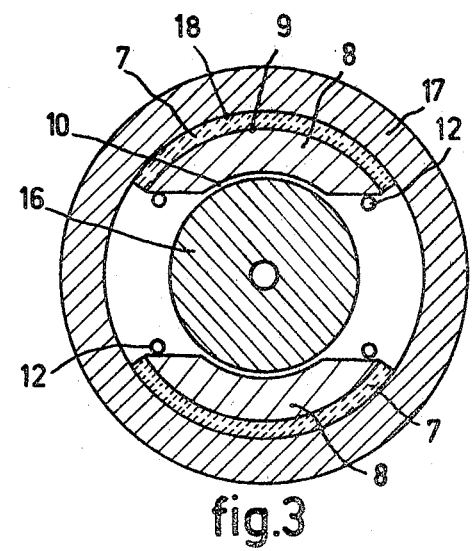
FIG. 3 shows a motor according to the invention for higher voltages and powers energized by permanent magnets.

The motor according to the invention is shown in FIG. 3 and is used at the same voltages and for the same purposes as the motor of FIG. 2. The rotor employed may also the the same. If the rotor 16 should be used together with a stator in the configuration of FIG. 1, this rotor would not be saturated and would not be utilized to its full voltage capacity. Instead of increasing the dimensions of the rotor or the number of turns, according to the invention, the dimension of the stator are increased and the configuration of the stator is altered so that the rotor can nevertheless be magnetized to saturation.

The increase of the dimensions of the stator 17 permits of also using larger permanent magnets 7, the flux of which is concentrated through pole pieces 8 and is passed on to the rotor 16. The ratio of the flux density at the air gap to the flux density supplied by the magnet 7 is approximately equal to that of the surface of the inner wall 9 of the magnet 7 to the surface along which the pole piece adjoins the air gap 10 if the flux is not concentrated too far beyond the knee of saturation. The desired dimensions of the permanent magnets, the shape and dimensions of the associated pole pieces and of the stator can thus be found. Ratios of from 1.5:1 up to 3:1 are suitable.

Figure 4:
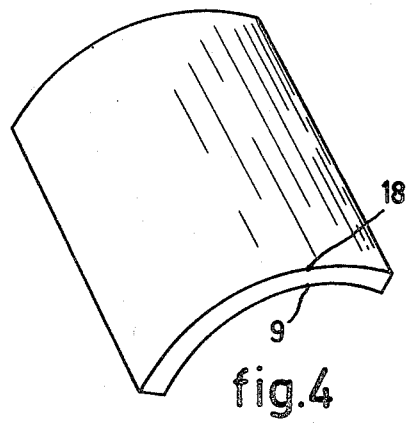
FIG. 4 shows one of the permanent magnets used. Each of these FIGS. is a sectional view at right angles to the motor shaft.

The outer wall 18 of each permanent magnet engages the inner side of the stator 17. The stator may consist of soft iron of soft steel and need not be laminated because the flux variations are small. This also applies to the pole pieces. However, it is sometimes desirable that the pole pieces be made of sheet iron because the passing rotor teeth produce a certain alternating flux. The stator is in the form of a tube. This tube may have a larger length that the magnet. In this case, the same stator reluctance can be obtained with a thinner tube. The tube may be closed at both ends with aluminum discs. The permanent magnets are in the form of hollow tube sectors (FIG. 4) and may be made, for example, of the aforesaid "Ferroxdure," of strontium ferrite or of a suitable alloy. The pole pieces and the magnets may be clamped to the stator, for example, by means of rods 12 secured in the aluminum discs.

As a matter of course, the invention may also be applied to multipolar motors.

A direct current commutator motor having a tubular stator housing, on the inner side of which are arranged curved permanent magnets which are provided with pole pieces, the surface along which the permanent magnets adjoin the pole pieces being larger than the magnetically active surface between the pole pieces and the rotor.

I claim:

1. A direct current motor comprising a tubular stator housing and a rotatable rotor member concentrically arranged within said stator housing, first and second permanent magnets each having the configuration of a hollow tube sector and concentrically mounted with their outer walls engaging the stator housing, first and second magnetic pole pieces each comprising a longitudinal segment of a cylinder having nonradial sidewalls defining the circumferential limits of the segment so that the outer circumferential surface of the segment is at least 1½ times longer than its inner surface, and means for concentrically mounting said first and second segments with their outer surfaces in contact with the inner surfaces of said first and second magnets, respectively, and with their inner surfaces facing said rotor to define an air gap therewith thereby to concentrate the magnetic flux within a given area.

2. A motor as claimed in claim 1 wherein each of said pole pieces are shaped to provide a pair of flat longitudinally extending surfaces, and said mounting means comprises a pair of longitudinally mounted rods for each pole piece and bearing against said flat surfaces.